United States Patent [19]

Wiedmann

[11] Patent Number: 4,861,615
[45] Date of Patent: Aug. 29, 1989

[54] METHODS FOR PREPARING CHOCOLATE MIXTURES

[75] Inventor: Werner Wiedmann, Stuttgart, Fed. Rep. of Germany

[73] Assignee: Werner & Pfleiderer GmbH, Fed. Rep. of Germany

[21] Appl. No.: 74,728

[22] Filed: Jul. 17, 1987

[30] Foreign Application Priority Data

Aug. 29, 1986 [DE] Fed. Rep. of Germany ....... 3629526

[51] Int. Cl.$^4$ ............................ A23G 1/00; A23G 3/00
[52] U.S. Cl. ...................................... 426/631; 426/660; 426/507; 426/511; 426/519; 426/516; 426/443; 426/486; 426/629; 426/613
[58] Field of Search ............... 426/660, 631, 516, 613, 426/507, 443, 486, 518, 519, 615, 629, 511

[56] References Cited

U.S. PATENT DOCUMENTS

| | | | |
|---|---|---|---|
| 3,904,777 | 9/1975 | Goerling et al. | 426/660 |
| 4,156,743 | 5/1979 | Schmitt | 426/660 |
| 4,440,797 | 4/1984 | Berkes et al. | 426/660 |
| 4,713,256 | 12/1987 | Chaveron et al. | 426/660 |

FOREIGN PATENT DOCUMENTS 1607821 5/1970 Fed. Rep. of Germany .
3417126 11/1985 Fed. Rep. of Germany .
0140729 5/1985 France .

*Primary Examiner*—Jeanette Hunter
*Attorney, Agent, or Firm*—Laff, Whitesel, Conte & Saret

[57] ABSTRACT

In a method of preparing a chocolate mixture in a continuous mode of operation with a high throughput, raw cocoa-bean fragments are supplied to a first housing zone of an extruder and after passing through a steam lock, are acted upon by high-pressure steam and, following thereon, the first zone is connected to a vacuum pump, the mixture being subjected in this manner to a mixing, kneading and degassing operation in the first zone. The mixture is then supplied to a second housing zone following on the first housing zone and is then supplied from the second housing zone directly to a comminuting device such as a hammer mill and, after being processed in the comminuting device, the mixture is immediately supplied to a third housing zone which follows directly on the second housing zone of the same extruder and which is likewise connected to a vacuum pump. Apparatus for carrying out the method comprises a twin-shaft screw extruder having a first housing zone to which is connected a product feed pipe, a steam-lock device and a high-pressure steam supply pipe.

15 Claims, 1 Drawing Sheet

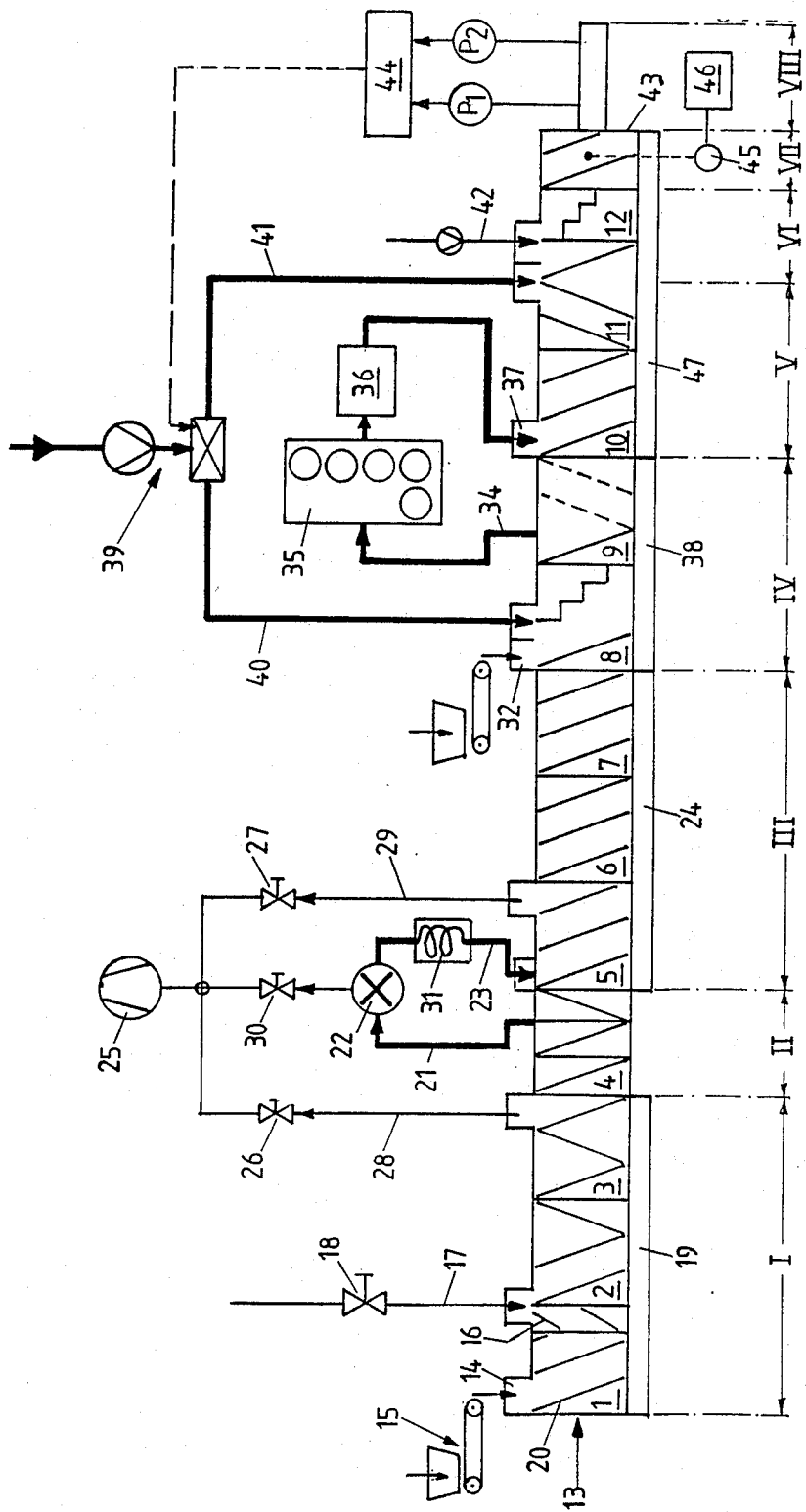

METHODS FOR PREPARING CHOCOLATE MIXTURES

FIELD OF THE INVENTION

This invention relates to methods and apparatus for preparing chocolate mixtures using twin-shaft screw extruders.

BACKGROUND OF THE INVENTION

A method of this type and such an apparatus using twin-shaft, interengaging, closely meshing screw extruders, are known from DE-OS No. 16 07 821.

It is further known from DE-PS No. 927 006 to provide, in a continuous process, first a vacuum dehumidifying zone to remove secondary constituents harmful to the aroma and then a refining zone.

EP-OS No. 140 729 describes a method using a screw extruder in which unwanted flavours (off-flavours) are removed from the finished mixture, there no high temperatures and degrees of humidity can be used so that roasting aromas, which are wanted in themselves, are also removed.

In DE-OS No. 34 17 126 a method is described in which the mixture becomes liquid during aerating and is forced into an extruder through a tamping screw. No great accuracy in proportioning is achieved by this means and the warm mixture cannot be sheared without being converted into caramel.

Starting from this known prior art, a continuous method of producing chocolate has been developed in which all discontinuous steps are eliminated. Nevertheless, the continuity of this method was achieved essentially in that a plurality of conventional individual units were connected in series through connecting pipes so that the simplification in the apparatus which should be aimed at as well as the corresponding compact construction and an associated sojourn time which should be as short as possible, could not be realized in the optimum manner.

SUMMARY OF THE INVENTION

It is the object of the invention to provide a method and an apparatus for the preparation of a chocolate mixture wherein as compact and inexpensive a construction of the apparatus as possible and a short sojourn time with very satisfactory aroma quality of the finished product are achieved in a continuous process with the elimination of batch mixers and conching.

Accordingly, one aspect of the present invention provides a method of preparing a chocolate mixture comprising mixing, freeing from gas and liquefaction of a starting product in a twin-shaft screw extruder having a plurality of housing sections; in which raw cocoa-bean fragments are supplied to a first housing zone of said extruder and, after passing through a steam lock, are acted by high-pressure steam; in which, following thereon, the first zone is connected to a vacuum pump and the mixture is subjected to a mixing, kneading and degassing operation in the first zone; in which the mixture is supplied directly, from a second housing zone following on the first zone, to a comminuting device and, after being processed in the comminuting device, is supplied directly to a third housing zone which follows on the second housing zone of the extruder and which is likewise connected to a vacuum pump.

As a result of acting on the raw material with high-pressure steam following on a steam lock immediately after introduction into the extruder, surprisingly, not only is the sterilization, known per se, achieved under the influence of high-pressure steam and shearing action but also, in addition, off-flavours are removed at the very beginning of the manufacturing process, that is to say before the formation of the desired roasting aromas, so that conching is no longer necessary at the end of the process. In addition, the extruder is simultaneously used as a feed pump for a comminuting device such as a hammer mill and the product discharged there is immediately re-introduced into one and the same extruder so that only one common drive is necessary and short distances and therefore short sojourn times can be realized.

Preferably, the throughput in the third housing zone of the extruder is adjusted so that only a partial filling occurs and a roasting in thin layers is caused by a heating of the housing wall in this third zone and the gases from the roasting are drawn off backwards.

As a result of the partial filling and heating of the housing wall in the third zone, a complete roasting in thin layers is achieved in co-operation with the unidirectional, self-cleaning twin-shaft extruder. The gases from the roasting can be drawn off backwards through the partial filling. As a result of the complete degassing achieved in the first stage, a preliminary degassing in the roasting stage can be dispensed with so that very short roasting times can be achieved.

Advantageously, only a single vacuum pump is used for the first, second and third housing zones.

Desirably, after the third housing zone serving for the roasting, the mixture is supplied to a fourth housing zone of the extruder in which the mixture is cooled and mixed with recipe ingredients. This arrangement renders possible cooling of the mixture in the same extruder so that the conventional roaster cooling stage can be dispensed with and the product can remain in the extruder.

When refined sugar in the form of crystals is used, the mixture leaves the extruder to re-enter this again after passing through a roller and possibly a fluidized bed for the exchange of material. This branching can also be accomplished with short paths.

The mixture then resulting is desirably supplied to a fifth housing zone of the extruder for the introduction of shearing forces. If a fluidized bed has been used for the exchange of material, the resulting loose powder is preferably allowed to trickle into an extruder inlet. Liquefaction is effected in a very short shearing zone and in the course of this the shearing intensity can be adjusted by a distribution of the cocoa-butter so that fluctuations in raw materials and proportioning can be compensated.

Lecithin and residual cocoa-butter may be mixed in, in a following sixth housing zone.

Apparatus for carrying out the above-described method preferably comprises a twin-shaft, interengaging, closely meshing screw extruder with the same direction of rotation, in which, in contrast to known methods of production, a few component steps do not merely take place one behind the other but it forms a single, central apparatus for the whole process, which, apart from its designated actions such as the introduction of shearing forces, mixing and proportioning, acts at the same time as a pump for the product mixture from the feed region to the discharge. As a result, short product paths and short sojourn times can be realized.

Said apparatus may thus comprise a twin-shaft screw extruder, a product feed pipe to a first housing zone of the extruder, a steam-lock device and a high-pressure steam supply pipe.

A second housing zone, constructed in the form of a pump zone, preferably follows on the first housing zone of the extruder and the apparatus preferably further comprises a comminuting device, a branch pipe leading from the second housing zone to the comminuting device and a further branch pipe leading from said device to a third housing zone of the extruder.

The third housing zone desirably comprises a heating zone and is preferably followed by a fourth housing zone with a cooling jacket. Advantageously, a tempering and shearing zone, a mixing zone and a pump zone follow on the fourth housing zone of the extruder.

According to a preferred embodiment, cocoa-butter supply pipes, which are preceded by a distributing and proportioning device lead into the fourth housing zone and into the tempering and shearing zone. Preferably, the distributing and proportioning device is connected to a viscosity measuring device arranged at the discharge end of the extruder.

In order to produce pretreated roasted cocoa paste which is sometimes produced in the country of origin of the cocoa or by a different manufacturer from the finished chocolate, instead of a single extruder, a division into two extruders can be effected. Accordingly, the present invention also provides a method of preparing a chocolate mixture comprising mixing and liquefaction of a starting product in a twin-shaft screw extruder; wherein a pre-refined, roasted cocoa paste is supplied, together with recipe ingredients, to the extruder and is mixed with these ingredients in a first mixing zone; wherein the mixture is supplied to a roller and possibly to a fluidized bed for the exchange of materials; and wherein the loose powder formed there is again introduced into the extruder in a following housing zone.

The mixture is desirably supplied to a further housing zone serving for the introduction of shearing forces and, preferably, following on the shearing zone, additives such as lecithin and residual cocoa-butter are mixed into the mixture in a further housing zone.

Apparatus for carrying out this method desirably comprises a twin-shaft screw extruder having a housing zone with a cooling jacket as a mixing zone. A tempering and shearing zone, a further mixing zone and a pump zone desirably follow on the mixing zone.

Preferably, cocoa-butter supply pipes, which are preceded by a distributing and proportioning device, lead into the mixing zone and into the tempering and shearing zone. Preferably too, the distributing and proportioning device is connected to a viscosity measuring device arranged at the discharge end of the extruder.

The two extruders may possibly have different screw diameters. The advantages of the method according to the invention or of the apparatus according to the invention are nevertheless preserved in principle.

BRIEF DESCRIPTION OF THE DRAWING

The invention will now be further described, by way of example, with reference to the drawing which is a diagrammatic, block-circuit-like illustration of one embodiment of an apparatus according to the invention.

DETAILED DESCRIPTION OF PREFERRED EMBODIMENT

Referring to the drawing, the apparatus comprises a twin-shaft screw extruder 13, rotating in one direction and comprising twelve housing sections 1 to 12, that is to say housing portions connected to one another.

The first housing section 1 has a feed opening 14 for raw bean fragments which are introduced through a proportioning device 15.

Disposed at the end of the first housing section 1 is a steam lock 16 behind which a feed pipe 17 with a proportioning device 18 for high-pressure steam leads into the transition region between the first and second housing sections 1 and 2. The steam lock 16, which is constructed in the form of a return element of the screw 20 causing a pile-up of material, prevents the high-pressure steam supplied from entering the first housing section 1. The second housing section 2 and the third housing section 3 following thereon are surrounded by a heating jacket 19.

The first three housing sections 1 to 3 together form a housing zone I in which the raw bean fragments are acted upon by 10% high-pressure steam via the feed pipe 17. Surprisingly, the supply of steam, heating (via the heating jacket 19) and shearing (by the screw 20 of the extruder 13) effected there not only has the sterilizing action known per se but in addition off-flavours are removed already in this phase. The crumbly material, which is difficult to proportion, remains in the extruder—which is particularly favourable in comparison with previously known apparatuses—which extruder, in a fourth housing section 4 corresponding to a second housing zone II, services as a pump to charge a hammer mill 22 through a branch pipe 21. From the hammer mill 22, the mixture passes, via a pipeline 23, into the initial region of a fifth housing section 5 which, together with two further housing sections 6 and 7, forms a third housing zone III which can be heated via a heating jacket 24. A vacuum pump 25 is connected to pipelines 28 and 29 leading respectively from the housing sections 3 and 5 through valves 26 and 27 and possibly to the hammer mill 22 through a valve 30. Since vacuum is applied in the housing zone I and in the housing zone III through the pipelines 28 and 29, a vacuum in the hammer mill 22 can also be dispensed with, that is to say any ordinary commercial mill can be used. The moisture in the extruder can be up to 10%. If a vacuum mill is used, which can be acted upon by vacuum through the valve 30, the possible humidity is higher but the mixture cools down and must be brought back to just below roasting temperature by means of a tubular heat-exchanger 31 disposed in the pipeline 23. In the housing zone III, roasting is effected up to 100% in thin layers in the partially filled, self-cleaning, twin-shaft extruder 13. Because of the partial filling, gases from the roasting can be drawn off backwards.

During the following on-line mixing, the mixture cools down so that a conventional roaster cooling stage can be dispensed with.

In a housing section 8, sugar in the form of confectioner's sugar or of crystals is added via a feed pipe 32 and is mixed in, in the housing section 8.

If confectioner's sugar is added, the mixture then remains in the extruder 13. If sugar in the form of crystals is used, the mixture leaves the extruder 13 via a branch pipe 34 leading from the following housing section 9 and is fed to a roller 35 and a fluidized bed 36 for the exchange of material to enter the housing section 10 immediately afterwards, via a proportioning funnel 37, in the form of loose powder trickling in. The use of a fluidized bed 36 for the exchange of material is not absolutely essential because the material transfer reactions are considerably intensified in comparison with previously known processes as a result of the high temperatures and low pressures in the first half of the extruder 13.

The housing sections 8 and 9, described above, which together form a housing zone IV, are surrounded by a cooling jacket 38 in order to achieve the desired cooling action.

The following housing sections 10 and 11 form a housing zone V in which a defined and controlled liquefaction is brought about by forming a very short shearing zone. The shearing intensity is adjusted in that cocoa-butter is supplied to the extruder 13 through a proportioning and distributing device 39 in such a manner that the amounts allocated to the pipelines 40 and 41 can be preset so that either a larger amount of cocoa-butter is introduced into the housing section 8 through the pipeline 40 or it is introduced into the housing section 11 through the pipeline 41. In addition, lecithin can also be fed into the housing section 11 through a pipeline 42.

In one part of the housing section 11 and of the housing section 12, the components cocoa-butter and lecithin supplied through the pipelines 41, 42, are mixed in while the portion of the housing section 12 at the end serves as a discharge pump. Accordingly, following on the housing zone V serving for the shearing, a housing zone VI for the mixing and a housing zone VII as a pump zone are formed by these housing sections. Following on these, at the discharge end 43 of the extruder is a housing zone VIII in which the viscosity is measured by means of a viscosity measuring device 44 via a pressure difference ($P_1-P_2$), the viscosity measuring device 44 being connected to the distributing and proportioning device 39 in order to adjust a desired output viscosity independently of fluctuations in raw materials and proportioning.

The finished chocolate mixture is then pumped into a storage tank, not illustrated, the pumping action of the screw 20 of the extruder 13 being used.

A temperature measuring device 45 is provided in the housing section 12 with a following temperature control device 46 through which the temperature of the housing sections 10 to 12 can be adjusted to a temperature of 40° C., for example, by means of a double jacket 47.

The apparatus described above comprising the housing zones IV to VIII can be used for the further processing of pre-treated, roasted cocoa paste, the housing zones I to III being provided on a separate extruder or the preparation being effected in other conventional manners.

The carrying out of the method according to the invention and the mode of operation of the apparatus according to the invention are made clear for various applications with reference to the following examples:

EXAMPLE 1

Production of plain, quality chocolate

A twin-shaft screw machine rotating in the same direction and protected from wear, of the type CONTINUA 120/48 D/50 rpm is used as an extruder.

Zone I:
500 kg/h of raw cocoa bean fragments with a 3% initial humidity are measured out into the first housing section. At the end of the first housing section, a steam lock is provided in such a manner that the product is locally compacted through a return element. High-pressure steam with a pressure of about 10 bar is introduced at 200° C. in a measured amount of 50 kg/h (10%) into the second housing section. The condensed steam heats the product from 20° C. to 100° C. Return elements are installed in the second and third housing sections to shear the product. By this means and by means of the superimposed housing heating of 250° C., the product temperature is increased to 170° C. This reduces the bacterial count to 1/1000 in 40 seconds. At the end of the third housing section, 55 kg/h of steam with all off-flavours are flashed at a pressure of 200 mbar. Wanted aromas cannot escape here because they are only formed downstream. The humidity drops to 2% and the temperature to 100° C.

Zone II:
The fourth housing section serves as a pump to charge the hammer mill. A return zone, which is the length of twice the screw diameter, builds up the necessary charging pressure of 5 bar at the end of the housing. The hammer mill works at atmospheric pressure. The ground, highly fluid, raw cocoa paste is continuously pumped from the hammer mill into the housing section 5. The temperature remains at 100° C., the fineness drops from 2 mm to 0.07 mm.

Zone III:
The cocoa paste is roasted in the fifth to the seventh housing sections. Since the screw turns are only 30% filled, the gases resulting from the roasting can be drawn off along the open extruder passage. The constant stripping off and re-arrangement in the extruder rotating in the same direction produces the necessary homogeneous thin layers without the risk of caking. In this region, a pure screw conveyor is provided, with a small pitch. The housing sections are heated to 250° C.; the product temperature reaches 150° C.; the vacuum is throttled to 900 mbar through a valve. The humidity drops here to 0.5%. The sojourn time is only 50 seconds.

Zone IV:
In the housing section 8, 500 kg/h of cold sugar in the form of crystals are added at a measured rate. As a result, a mixed temperature of 80° C. results instantaneously and drops to 40° C. as a result of cooling of the housing wall. The housing sections 7 and 8 are thermally insulated in the flange region. The mixing is effected by kneading blocks. Some of the cocoa-butter is pumped into the housing section 8 (10 kg/h), in order to provide the necessary consistency for the refiner. The crumbly pasty mixture is pumped, in the housing section 9, by return screw threads, through an opening situated at the bottom, onto a belt to the refiner, that is to say to the roller arrangement. There the fineness drops to 0.018 mm and the powdery rolled material is returned, at a measured rate, to the housing section 10, at 40° C., via a second belt.

Zone V:
In the eleventh housing section, the mixture is deliberately sheared by return elements in order to disperse the cocoa particles in cocoa-butter. For this purpose, 0.03 KWh/kg are necessary. If less energy is introduced, the dispersion is too poor and the flow behaviour inadequate. If more energy is introduced, secondary agglomerates are produced which bind fat, which likewise impairs the flow behaviour. Only in the mid energy range is the correct final viscosity of 1.2 Pas obtained, even in the very short shearing zone, with a flow limit of 15 Pa. The introduction of energy is determined by the distribution of the cocoa-butter in the housing sections 8 and 11. More butter in the housing section 8 before the shearing zone (supplied through the pipeline 40) reduces the introduction of energy. In this example, 70 kg/h are introduced at a measured rate into the housing section 11 and, in addition, 5 kg/h (0.5%) of lecithin as an emulsifier. The temperature rises to 60° C. The housing sections 10 to 12 are adjusted to a temperature of 40° C.

Zone VI:

Lecithin and residual butter are mixed in by means of kneading blocks. There is no change in temperature.

Zone VII:

Conveyor elements build up the necessary extrusion pressure of 2 bar.

The total sojourn time of the mixture in the apparatus is about 5 minutes.

Zone VIII:

The viscosity is measured on-line through a pressure difference. This regulating variable adjusts the distribution of cocoa-butter in the device 39.

EXAMPLE 2

Production of milk quality chocolate

Production is effected with a quantity of 1 t/h. The procedure corresponds to that according to Example 1, the only difference being that 300 kg/h of bean fragments are introduced at a measured rate into zone I and 200 kg/h of whole-milk powder and 500 kg/h of sugar in the form of crystals are introduced at a measured rate into zone IV.

After the roller arrangement (refiner), the powder flows through a fluidized bed, first for 3 minutes at 100° C. with the action of hot air and heating to 60° C., then 1 minute with 20° C. room air and cooling to 40° C. In the course of this 1% of moisture, which is caused by the milk powder, escapes and interfacial reactions take place between the sugar and milk surfaces formed in the refiner.

EXAMPLE 3

Production of consumption chocolate or coating chocolate

Starting from a lower bean quality (many offflavours, many germs), a higher water content (20% addition) is used in the housing zone I, in contrast to Example 1. This requires a vacuum pump or 200 mbar in order to reduce the moisture to 2%.

During the grinding, the temperature drops to 80° C. and must be brought back to 120° C. through a tubular heat exchanger 31. Confectioner's sugar is added in measured quantities in the housing zone IV, the mixed product remains in the extruder. The final quality is appreciably coarser but adequate as consumer quality or coating chocolate.

EXAMPLE 4

Production of pre-treated, roasted cocoa paste

In this example, as distinct from the use of a single extruder which is fundamentally aimed at, two different extruders are used which can then have different screw diameters and speeds of rotation. An extruder of the type CONTINUA with a screw diameter of 120 mm and a speed of rotation of 150 rpm, protected against wear, is used for the method steps taking place in the housing zones I to III in accordance with Example 1.

For the method steps corresponding to the housing sections IV to VIII in accordance with Example 1, an extruder of the type CONTINUA with a screw diameter of 83 mm and 400 rpm, nitrided, is used for a throughput of 1 t/h of chocolate mixture.

In order to achieve an extremely powerful removal of off-flavours and extremely high degrees of roasting, the stage corresponding to the housing zone I can be extended from 3 to 5 housing sections and the stage corresponding to the housing zone III from 3 to 6 housing sections.

EXAMPLE 5

Production of crumb chocolate

If the apparatus is divided after housing section 7, the zone IV can be extended from 2 to 9 housings, that is to say the second extruder becomes 12 housing sections long. This enables slow thermal Maillard reactions to be carried out between amino acids and reducing sugars, that is to say after the mixing together of the mixture and sugar components. The reactions take place in shearing zones and with external housing heating to about 150° C. The resulting taste is called crumb. Maillard reactions or the Maillard effect are understood to mean a group of chemical reactions to form an aroma typical of the variety.

The invention is not restricted to the above-described examples but modifications and variations may be made without departing from the spirit and scope of the invention.

I claim:

1. A method of preparing a chocolate mixture comprising the successive steps of
   feeding a starting product formed by cocoa-bean fragments to a first housing zone of a first housing section of a twin-shaft screw extruder having a plurality of housing sections, a steam lock being arranged at the downstream end of said first housing zone,
   treating said product in a second zone of said first housing section by high-pressure steam supplied by means of a feed pipe at the upstream end of said second housing zone,
   mixing and kneading said product in said second and a third housing zone of said first housing section,
   degassing said thus formed product mixture by removing steam by means of a vacuum pump connected with the downstream end of said third housing zone by means of a pipeline,
   feeding said product mixture from a second housing section arranged downstream said first housing section to a comminuting device arranged outside the extruder,
   processing the product mixture in a comminuting device,
   feeding said processed product mixture directly to a third housing section of said extruder arranged downstream said second housing section, and
   degassing said product mixture by removing steam by a vacuum pump connected to the downstream end of a first housing zone of said third housing section by means of a pipeline.

2. A method as claimed in claim 1, further comprising the steps of
   adjusting the through-put in the third housing section of the extruder so that only partial filling of said third housing section occurs,
   heating the housing wall of said third housing section up to temperatures of at least about 250° C., thus performing a roasting in thin layers, and
   removing the gasses from said roasting in a direction upstream through the extruder.

3. A method as claimed in claim 2, in which a single vacuum is used for removing steam form the first and third housing section and from the comminuting device.

4. A method as claimed in claim 2, comprising further the steps of
   cooling the product mixture in a fourth housing section of the extruder downstream said third housing section, and
   mixing said product mixture with recipe ingredients.

5. A method as claimed in claim 4, in which said recipe ingredients comprise refined sugar in crystals comprising the further steps of
   supplying said product mixture to a roller outside the extruder and possibly to a fluidized bed for the exchange of material, and
   introducing this thus formed loose powder back into a fifth housing section of the extruder arranged downstream said fourth housing zone in said extruder.

6. A method as claimed in claim 4, comprising further the step of introducing shearing forces into said product mixture in said fifth housing section.

7. A method as claimed in claim 6, comprising further the step of feeding additives such as lecithin and residual cocoa-butter to a sixth housing section of said extruder arranged downstream said fifth housing section and mixing same with the product mixture.

8. A method as claimed in claim 1, comprising the heating of the product in said second zone of said first housing section by high pressure steam to about 100° C.

9. A method as claimed in claim 1 comprising the mixing and kneading of said product in said second and third housing zone, thus heating the product to about 100° C.

10. A method as claimed in claim 1, comprising the removing of steam from said third housing zone, thus lowering the product temperature to about 100° C.

11. A method as claimed in claim 1, comprising a residual time of said product in said second and third housing zones of about 40 seconds.

12. A method as claimed in claim 2, comprising the heating of the housing walls thus that the temperature of the product is raised to about 150° C.

13. A method as claimed in claim 2, comprising a residual time of about 50 seconds in said third housing section 14. A method as claimed in claim 4, comprising the cooling of the product mixture to about 40° C.

15. A method as claimed in claim 1, comprising an overall residual time of the product mixture in said housing section of about 5 minutes.

* * * * *